United States Patent [19]
Cathey

[11] Patent Number: 5,881,298
[45] Date of Patent: Mar. 9, 1999

[54] PORTABLE COMPUTER WITH SELECTIVELY OPERABLE COOLING UNIT

[75] Inventor: David A. Cathey, Boise, Id.

[73] Assignee: Micron Technology, Inc., Boise, Id.

[21] Appl. No.: 707,634

[22] Filed: Sep. 5, 1996

[51] Int. Cl.$^6$ .................................................. G06F 1/00
[52] U.S. Cl. ............................................ 395/750.06
[58] Field of Search .................. 395/750.06, 750.01, 395/750.08; 361/678, 687, 676; 364/707

[56] References Cited

U.S. PATENT DOCUMENTS

| | | | |
|---|---|---|---|
| 5,058,389 | 10/1991 | Yasuda et al. | 361/687 |
| 5,167,024 | 11/1992 | Smith et al. | 395/750.06 |
| 5,249,741 | 10/1993 | Bistline et al. | 236/49.3 |
| 5,381,043 | 1/1995 | Kohiyama et al. | 307/116 |
| 5,396,635 | 3/1995 | Fung | 395/750.06 |
| 5,504,924 | 4/1996 | Ohashi et al. | 361/687 |
| 5,513,361 | 4/1996 | Young | 364/707 |
| 5,579,524 | 11/1996 | Kikinis | 395/750.06 |
| 5,631,852 | 5/1997 | Chen | 395/750.06 |
| 5,636,103 | 6/1997 | Bushner | 361/687 |
| 5,687,079 | 11/1997 | Bauer et al. | 364/175 |
| 5,713,030 | 1/1998 | Evoy | 340/584 |
| 5,752,011 | 12/1998 | Thomas et al. | 395/556 |

*Primary Examiner*—Meng-Ai T. An
*Assistant Examiner*—Paul R. Myers
*Attorney, Agent, or Firm*—Seed and Berry, LLP

[57] ABSTRACT

A portable computer that conserves power when the computer operates from its portable power source. The portable computer has a processor operatively coupled to an input device, an output device, and a memory device. The portable computer also includes a portable power source operatively coupled to the processor, and a selectively operable cooling system that is adapted to create a heat transfer zone in which heat dissipates from the processor. The cooling system has a cooling unit that may be selectively disabled in a desired power-saving mode during which the processor may continue to operate. The cooling unit is preferably disabled by electrically disconnecting the cooling unit from the portable power source to de-energize the cooling system, or by physically disconnecting the cooling system from the portable computer.

11 Claims, 6 Drawing Sheets

PORTABLE COMPUTER WITH SELECTIVELY OPERABLE COOLING UNIT

TECHNICAL FIELD

The present invention relates to portable computers, and more particularly to a cooling system for dissipating heat from processors in portable computers.

BACKGROUND OF THE INVENTION

Portable computers, or laptop computers as they are also called, are easily transportable computers that operate from either an external power source in a base operating mode, or a portable power source in a portable operating mode. External power sources are generally electrical outlets that have a supply of alternating current (AC) power, while portable power sources are generally rechargeable batteries that are housed in the computer. The processor is coupled to one or more input devices, such as a key board or mouse, and output devices, such as a printer or display unit. In use, an operator generally inputs data to the processor through the input devices, and the output devices visually present to the operator the data generated by the processor.

One objective of portable computers is to maintain an adequate processor operating rate for running software applications. Processor manufacturers continually develop faster, more powerful processors as measured by the number of calculations that may be performed in a second. In general, more powerful processors consume more electrical energy and produce more heat energy than earlier generations of slower processors. For example, the more powerful Intel® Pentium Pro processor consumes approximately 23.2–31.7 W of power, while the slower Intel® 486 processor only consumes about 1.4W–6W of power. As a result, more powerful processors produce more heat than slower processors. One difficulty in using more powerful processors is that their operating temperatures increase with increasing operating speed. Thus, high speed portable computers generally have cooling systems that dissipate heat from the processors.

Conventional cooling systems in computers are typically active cooling systems that consume power, or a combination of active cooling systems and passive cooling systems. Examples of active cooling systems include electrical fans that blow air across the processor, or thermoelectric heat pumps that draw heat away from the processor. Passive cooling systems are generally heat sinks attached to the processor to increase the surface area over which heat dissipates from the processor.

One general problem created by more powerful processors is that their high power consumption significantly reduces the period during which a portable computer can operate from its portable power source. The high-powered processors not only consume more power themselves, but the conventional cooling units on the portable computers also consume more power to dissipate the additional heat generated by the processors. Therefore, to increase the period during which the computer can operate from its portable power source, it is generally desirable to reduce the rate at which the computer components consume power from the portable power source.

A more specific problem of conventional active cooling systems is that they continuously operate and consume power throughout the operation of the computer. Since the new, more powerful processors consume even more power than earlier generations of processors, continuously operating the cooling unit further reduces the period that a computer can operate from its portable power source. Thus, it would be desirable to develop a cooling system that conserves power when the computer operates from its portable power source.

Another problem of conventional cooling systems is that their size and weight generally reduce the portability of portable computers. Yet, an important aspect of portable computers is minimizing their size and weight to make them easier to carry and store. Thus, it would also be desirable to develop a cooling system that enhances the portability of portable computers.

SUMMARY OF THE INVENTION

The inventive portable computer conserves power when the computer operates from its portable power source, and enhances the portability and design flexibility of portable computers. A portable computer of the present invention has a processor operatively coupled to an input device, an output device, and a memory device. The portable computer also includes a portable power source operatively coupled to the processor, and a selectively operable cooling system with a cooling unit that may be selectively disabled to conserve power in a desired power-saving mode during which the processor may continue to operate. The cooling unit is preferably selectively disabled by de-energizing the cooling unit and/or by physically disconnecting the cooling unit from the portable computer.

In one embodiment, the cooling system is de-energized by a switch that electrically disconnects the cooling unit from the portable power source. In another embodiment, the cooling system has a removably attachable cooling unit that may be physically disconnected from the housing to disable the cooling system. The removably attachable cooling unit is preferably a free-standing cooling unit that may be detached from the computer and left at a base site. The free-standing cooling unit, therefore, does not necessarily travel with the other components of the computer.

When the cooling unit is disabled in the power-saving mode, the portable computer of the present invention preferably controls the processor operating rate in response to the operating temperature. In one embodiment, the clock is connected to a clock divider that changes the clock output by a factor of $2^n$, and the processor is coupled to the clock output through a multiplexer ("MUX"). The processor operating rate is controlled by the processor, which receives a measurement of the operating temperature from a temperature sensor proximate to the processor, and then signals the MUX to select a desired clock output to operate the processor at a desired operating rate. For example, when the operating temperature is greater than a predetermined high-limit temperature, the clock frequency is reduced to conserve power and decrease the operating temperature. Conversely, when the operating temperature falls below a predetermined low temperature, the clock frequency is increased. By reducing the clock frequency when the cooling unit is disabled in the power-saving mode, the portable computer conserves power and prevents the processor from being damaged.

DETAILED DESCRIPTION OF THE INVENTION

The present invention is a portable computer with a selectively operable cooling system that conserves power in a desired power-saving mode during which the processor operates. The desired power-saving mode generally occurs when the operating temperature of the processor is within an acceptable range and the portable computer operates from its portable power source. An important aspect of the invention is that the cooling system may be selectively disabled to reduce the rate at which power is consumed from the portable power source. When the cooling system is disabled, the temperature of the processor can be maintained within acceptable limits by running the fast processor at a slower speed to reduce power consumption and the heat generated by the processor. Thus, in accordance with the invention, there may be a trade-off between the operating speed of the processor and the length of the period during which the computer can operate from its portable power source. By allowing the cooling system to be selectively disabled, an operator can elect to prolong the life of the charge in the portable power source, particularly when a slower processor speed is adequate to run a specific software application.

Figure 1:
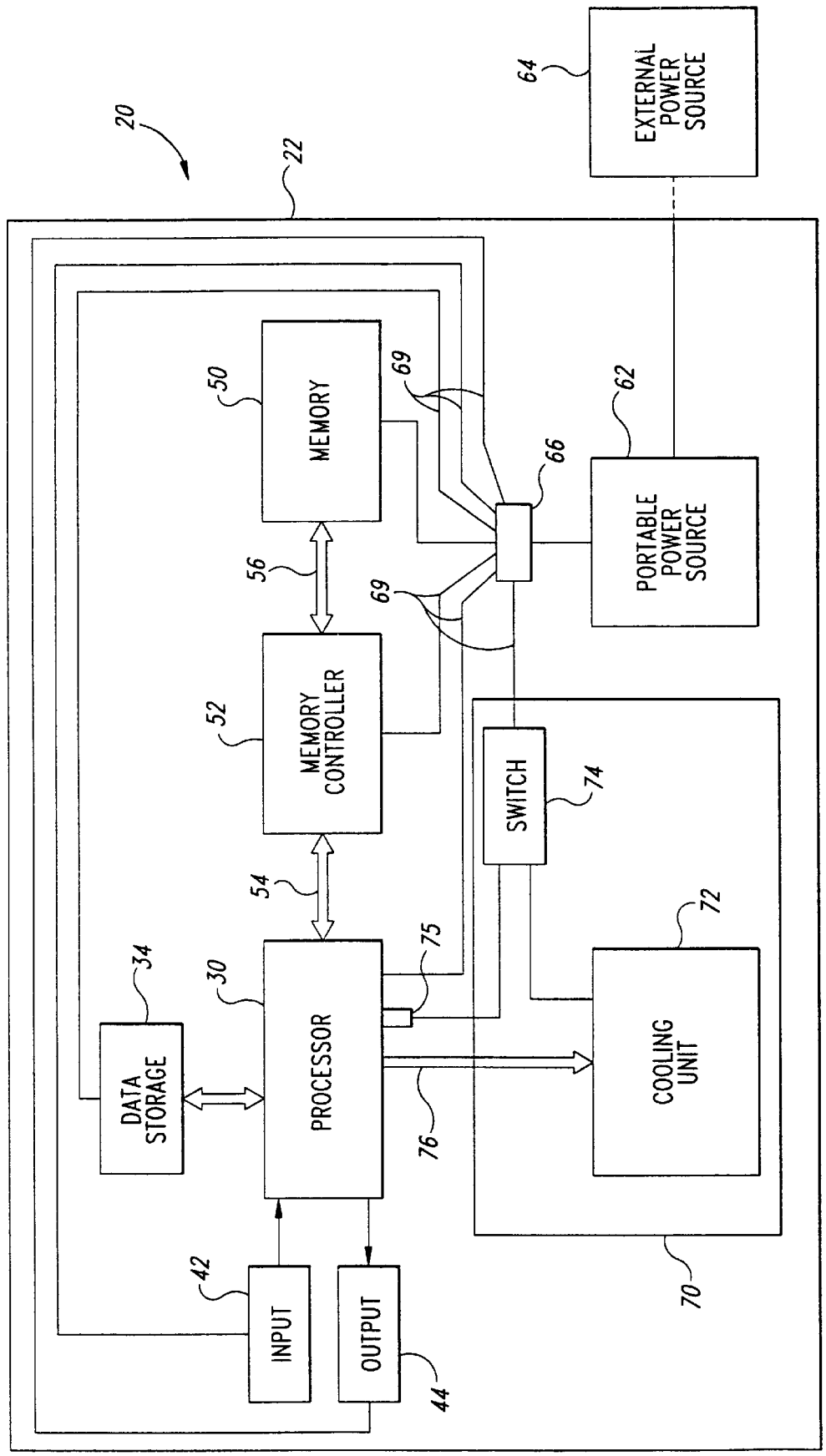
FIG. 1 is a block diagram of a portable computer in accordance with the invention.

FIG. 1 is a block diagram of a portable computer system 20 in accordance with the invention that includes a processor 30 which executes desired calculations and tasks, and performs other computer functions. The processor 30 is connected to a memory device 50 through a memory controller 52, which provides appropriate signals to the memory device 50 for retrieving and storing data. One or more input devices 42, such as a keyboard or mouse, are coupled to the processor 30 to allow an operator (not shown) to input data into the processor 30. Similarly, one or more output devices 44 are coupled to the processor 30 to present the operator with the data generated by the processor 30. Typical output devices 44 include printers or display units. One or more data storage devices 34 are coupled to the processor 30 to store data on or retrieve data from mass storage media (not shown). Examples of data storage devices 34, and corresponding storage media, include drives that accept hard and floppy disks, tape cassettes, and compact disc read-only memories (CD-ROMs). Typically, the processor 30 generates various address data and control signals on busses 54 and 56 that couple the processor 30 to the memory controller 52, and couple the memory controller 52 to the memory device 50, respectively. The busses 54 and 56 are typically a combination of address buses, data buses, and control/status lines.

The portable computer 20 receives power from either a portable power source 62 in a portable operating mode, or an external power supply 64 in a base operating mode. The portable power source 62 is typically a rechargeable battery carried within the portable computer 20, but other portable power sources may be used in the invention. The external power supply 64 is typically powered by an AC outlet, and it converts the AC power to direct current (DC) to both recharge the portable power source 62 and power the computer 20. The portable power source 62 is connected to a junction 66, and a number of lines 69 connect the junction 66 to each of the processor 30, input device 42, output device 44, memory device 50, and memory controller 52.

The portable computer 20 also has cooling system 70 housed within the portable computer 20. The cooling system 70 has an active cooling unit 72, which may be a fan or a thermoelectric heat pump, and a switch 74 coupled to the cooling unit. The cooling unit 72 creates a heat transfer zone 76 through which heat dissipates from the processor 30 to cool the processor 30. When the cooling unit 72 is a fan, the cooling unit 72 is preferably positioned proximate to the processor 30 to maximize the velocity of the fluid stream produced by the fan across the surface area of the processor 30. In the case of a thermoelectric heat pump, the cool side of the heat pump is preferably attached to the top of the processor 30 to draw heat away from the processor. The heat transfer zone 76 accordingly corresponds to the type of cooling unit 72; in the case of a fluid stream, for example, the heat transfer zone 76 is defined by the path of the fluid stream within the portable computer 20. In the embodiment of the portable computer 20 illustrated in FIG. 1, the cooling system 70 is preferably fixedly attached to the portable computer 20.

The switch 74 selectively energizes and de-energizes the cooling unit 72 to cool the processor 30 or to conserve power, respectively. The cooling unit 72 is preferably de-energized by opening the switch 74 in a power-saving mode during which the processor 30 may continue to operate. As discussed in greater detail below, it may be necessary to reduce the operating rate of the processor 30 when the cooling unit 72 is de-energized in the power-saving mode to prevent the operating temperature from rising above a predetermined temperature limit.

The switch 74 may be an automatic switch controlled by a thermostat 75 proximate to the processor that detects when the operating temperature rises above a maximum temperature and signals the switch 74 to energize the cooling unit 72. In another embodiment, the automatic switch 74 is controlled by a sensor (not shown) that detects when external source 64 supplies power to the computer 20. Such sensors are well known in the art, and they are currently used to activate circuitry that reduces power to displays when power is supplied from the portable power source. The switch 74 may also be a manual switch mounted in the cabinet of the portable computer 20 to allow the operator to manually energize and de-energize the cooling unit 72. A simple push-button or toggle switch well known in the art may be used as a manual switch.

The parameters for selectively energizing and de-energizing the cooling unit 72 are generally controlled by how the operator elects to resolve the trade-off between a higher operating speed and a high rate of power consumption. In the cooling mode, a higher rate of power consumption will result in a shorter operating time for the portable power source 64. In the power saving mode, the lack of any cooling for the processor 30 will generally require that the processor 30 be operated at a slower operating speed to reduce power consumption and the heat generated by the processor.

Although it will usually be possible to de-energize the cooling unit 72 when the computer 20 is powered from the external source 64, it is sometimes desirable to energize the cooling unit 72 when the portable computer operates from its portable power source 62 so that the processor 20 can run at high speeds. For example, the cooling unit 72 is preferably energized irrespective of the source of power when large spreadsheet software is operating to reduce the computational delays incurred at lower processor operating speeds. The cooling unit 72 may also be energized irrespective of the power source when the operating temperature of the processor reaches a maximum operating temperature above which the processor 30 may be damaged, as discussed above.

Figure 2:
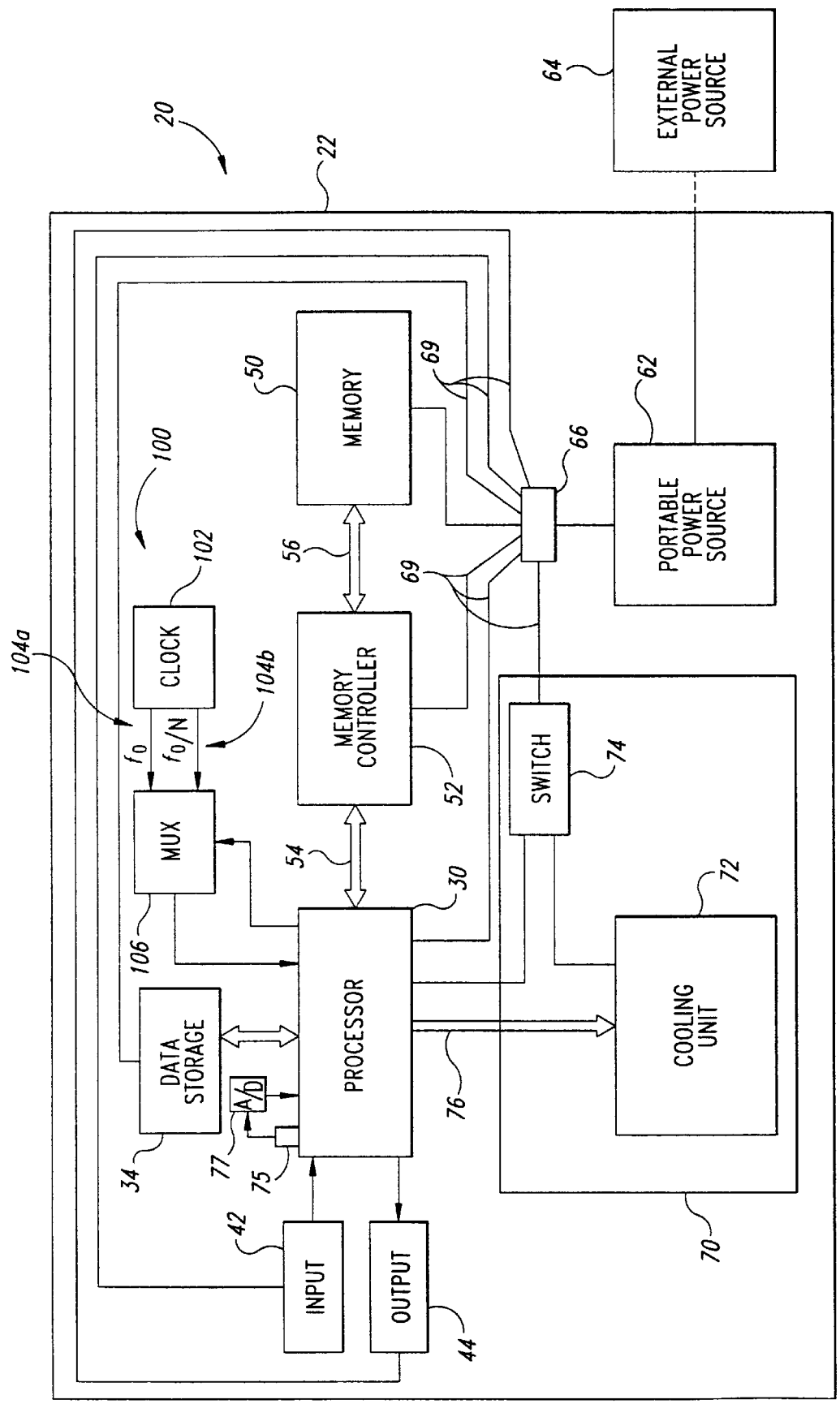
FIG. 2 is a block diagram of another portable computer in accordance with the invention.

FIG. 2 illustrates another embodiment of the invention in which the cooling system 70 works in conjunction with a processor rate control system 100 that selectively changes the processor operating rate. The processor control system 100 has a clock 102 adapted to generate a plurality of clock output frequencies 104(a) and 104(b), and a MUX 106 coupled to the processor 30 and the clock outputs 104(a) and 104(b). The clock output frequencies 104(a) and 104(b) may be generated by a clock divider that divides the maximum clock frequency $f_o$ by a number N, where N is between 2 and $2^n$. It will be appreciated that more than two output frequencies may be used in the invention; for example, the output frequencies may be $f_o$, $f_o/2$, $f_o/4$, and $f_o/8$ for a control system 100 with four clock output frequencies. A temperature sensor 75 is coupled to the processor 30 to measure the processor operating temperature, and an analog-to-digital converter 77 is coupled between the temperature sensor 75 and the processor 30 to convert the analog measured temperature into a digital representation of the temperature.

Figure 3:
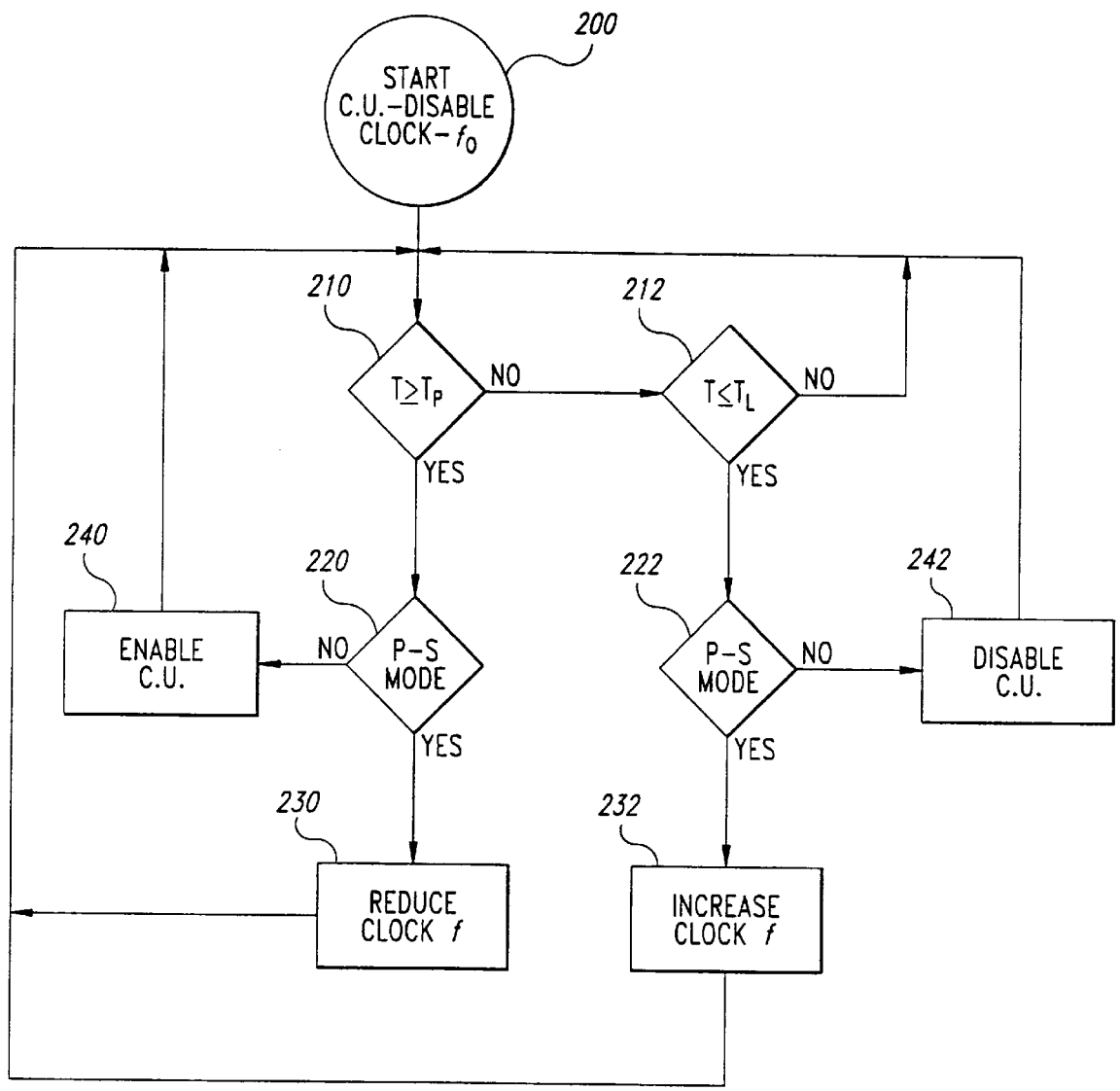
FIG. 3 is a flow chart of the operation of the computer of FIG. 2.

FIGS. 2 and 3 illustrate the operation of the portable computer 20 with the selectively operable cooling system 70 and the processor rate control system 100. At the start-up phase 200, the cooling unit 72 is disabled and the clock operates at its maximum frequency $f_o$. The processor 30 compares the measured temperature T with a predetermined high-limit temperature $T_P$ in step 210. If T is greater than or equal to $T_P$, the processor 30 proceeds to step 220 and either reduces the clock frequency in step 230 when the portable computer is in the power-saving mode, or enables the cooling unit 72 when the computer is not in the power-saving mode. It will be appreciated that reducing the clock frequency in the power-saving mode conserves power and reduces the heat generated by the processor. Thus, the reducing clock frequency may sufficiently cool the processor in the power-saving mode.

Still referring to FIGS. 2 and 3, if T is less than $T_P$, the processor proceeds to step 212 where it compares the measured temperature T with a predetermined low temperature $T_L$. If T is greater than $T_L$, the processor 30 proceeds to sample the measured temperature again and returns to step 210. If T is less than or equal to $T_L$, the processor 30 proceeds to step 222 and either increases the clock frequency in step 232 when the computer 20 is in the power-saving mode, or disables the cooling unit 72 when the computer is not in the power-saving mode.

Figure 4:
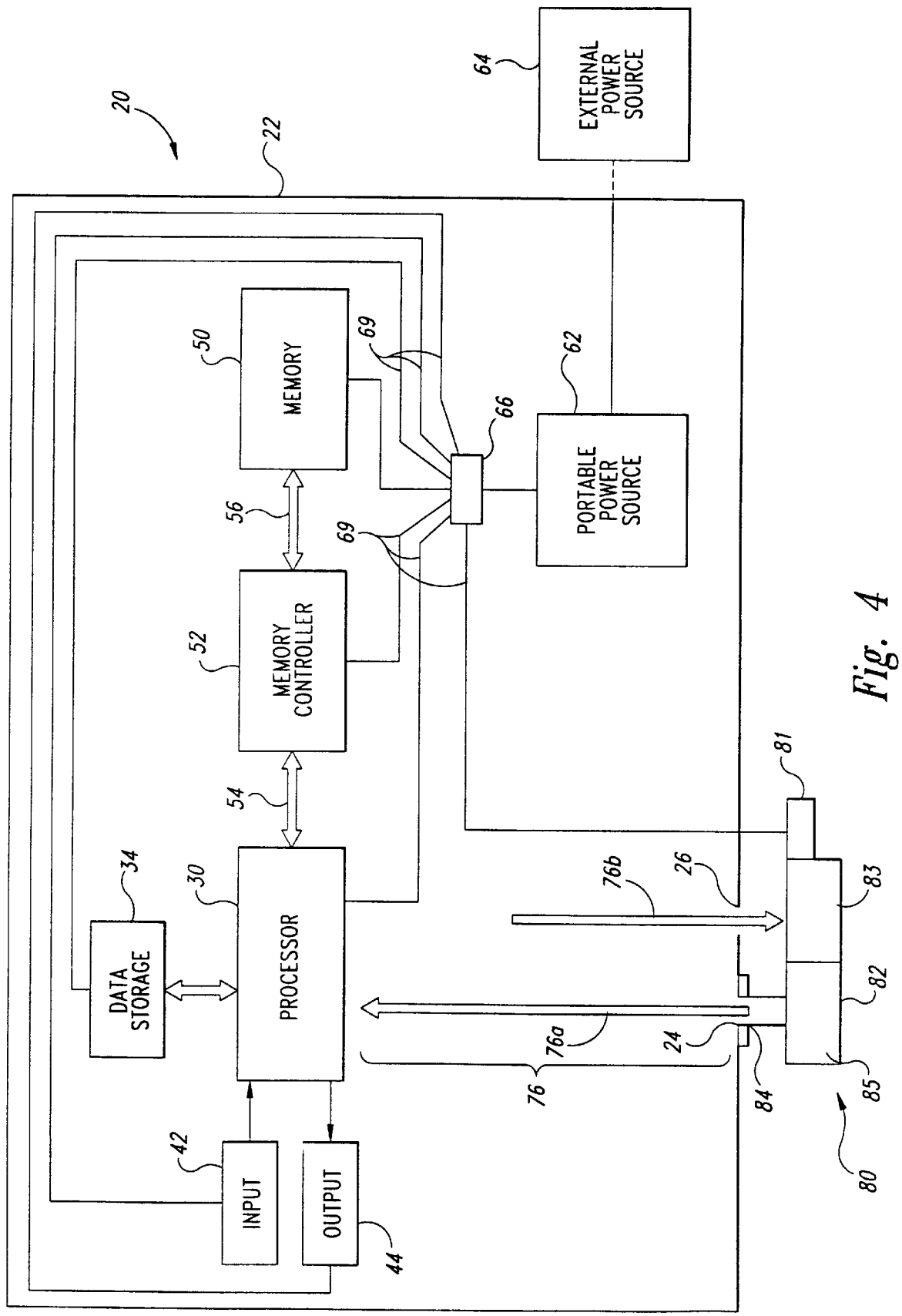
FIG. 4 is a block diagram of another portable computer in accordance with the invention.

FIG. 4 illustrates another embodiment of the portable computer 20 that has a separate, removably attachable cooling system 80 connected to the housing 22 of the portable computer 20. The cooling system 80 is preferably a free-standing component with respect to the other components of the portable computer 20 that may or may not be carried with the portable computer when it operates in a portable mode.

The cooling system 80 has an active cooling unit 82 and a coupling 84 connected to the cooling unit 82. The coupling 84 attaches the cooling unit 82 to an inlet port 24 in the housing 22 of the portable computer 20 by suitable means. It will be appreciated that many different devices may be used to attach the coupling 84 to the inlet port 24, as known to a person having skill in the art of hose fittings or heating and air conditioning equipment. The coupling 84 defines a conduit through which the cooling unit 82 drives a stream of cooling fluid 76(a) into a cavity within the housing 22 of the portable computer 20. The cooling fluid stream 76(a) passes across the processor 30, dissipates heat from the processor 30, and becomes a heated fluid stream 76(b) that exits to the atmosphere through an outlet port 26 in the housing 22 of the portable computer 20. The fluid streams 76(a) and 76(b) define the heat transfer zone 76 in which the cooling system 80 dissipates heat from the processor 30. A number of caps (not shown) preferably cover the inlet and outlet ports 24 and 26 when the cooling system 80 is disconnected from the housing 22 to enclose the cavity within the housing 22 and prevent particulate matter from entering the housing 22. Because the outlet port 26 is open to the atmosphere, the cooling system 80 of FIG. 4 is accordingly an open-end cooling system that uses air as a cooling medium.

The cooling unit 82 may be a fan that blows air through the coupling 84 and into the internal cavity of the housing 22, or an air-conditioner that reduces the temperature of the ambient air as it is blown into the cavity of the housing 22. An air-conditioning cooling unit 82 preferably has a fan 83 and heat exchanger 85 to reduce the temperature of the ambient air. Thus, an air-conditioning cooling unit 82 further reduces the operating temperature of the processor 30 below that of conventional cooling systems that use only a fan to blow air at the ambient temperature across the processor 30.

In operation, the cooling system 80 is enabled by connecting the coupling 84 to the inlet port 24, and actuating a switch 81 coupled to the cooling unit 82 to energize the cooling unit 82. When the portable computer 20 operates in the power-saving mode, the cooling system 80 is preferably disabled from operation either by physically disconnecting the coupling 84 from the inlet port 24 and removing the cooling system 80 from the housing 22 of the portable computer 20, or by de-energizing the cooling unit 82 through the switch 81. The cooling unit 80 is preferably disabled when the computer 20 operates from the portable power source 62. As with the cooling system 70 of FIG. 1, the cooling system 80 illustrated in FIG. 4 may work in conjunction with a processor rate control system (shown in FIGS. 2 and 3).

The separate, removably attachable cooling unit 80 illustrated in FIG. 4 offers several advantages over conventional portable computer cooling systems. As with the on-board cooling systems 70 illustrated in FIGS. 1 and 2, the cooling system 80 of FIG. 4 may be selectively enabled in a cooling mode to allow the processor 30 to operate at a faster speed, or selectively disabled in a power-saving mode to reduce the power consumed by the computer. Therefore, the cooling system 80 provides the flexibility to increase the processor operating rate or increase the period during which the portable computer can operate from its portable power source.

Another advantage of the cooling system 80 illustrated in FIG. 4 is that it provides additional space within the housing 22 of the personal computer 20 for additional memory devices or drivers, or it allows the housing 22 to be smaller. By providing a separate, removably attachable cooling system 80, space within the housing 22 that would otherwise be occupied by an on-board cooling system may be utilized for other purposes. Moreover, the weight of the portable computer 20 may be reduced by the omission of a cooling system in the housing 22.

Still another advantage of the cooling system 80 is that more powerful cooling units 82 may be used compared to conventional on-board cooling systems. It will be appreciated that most air-conditiong compressors are too heavy and too large to mount within the housing 22 of the portable computer 20. Therefore, by providing a separate, removable cooling unit 82, the present invention can use larger and more powerful cooling units to further reduce the operating temperature of the processor 30.

Figure 5:
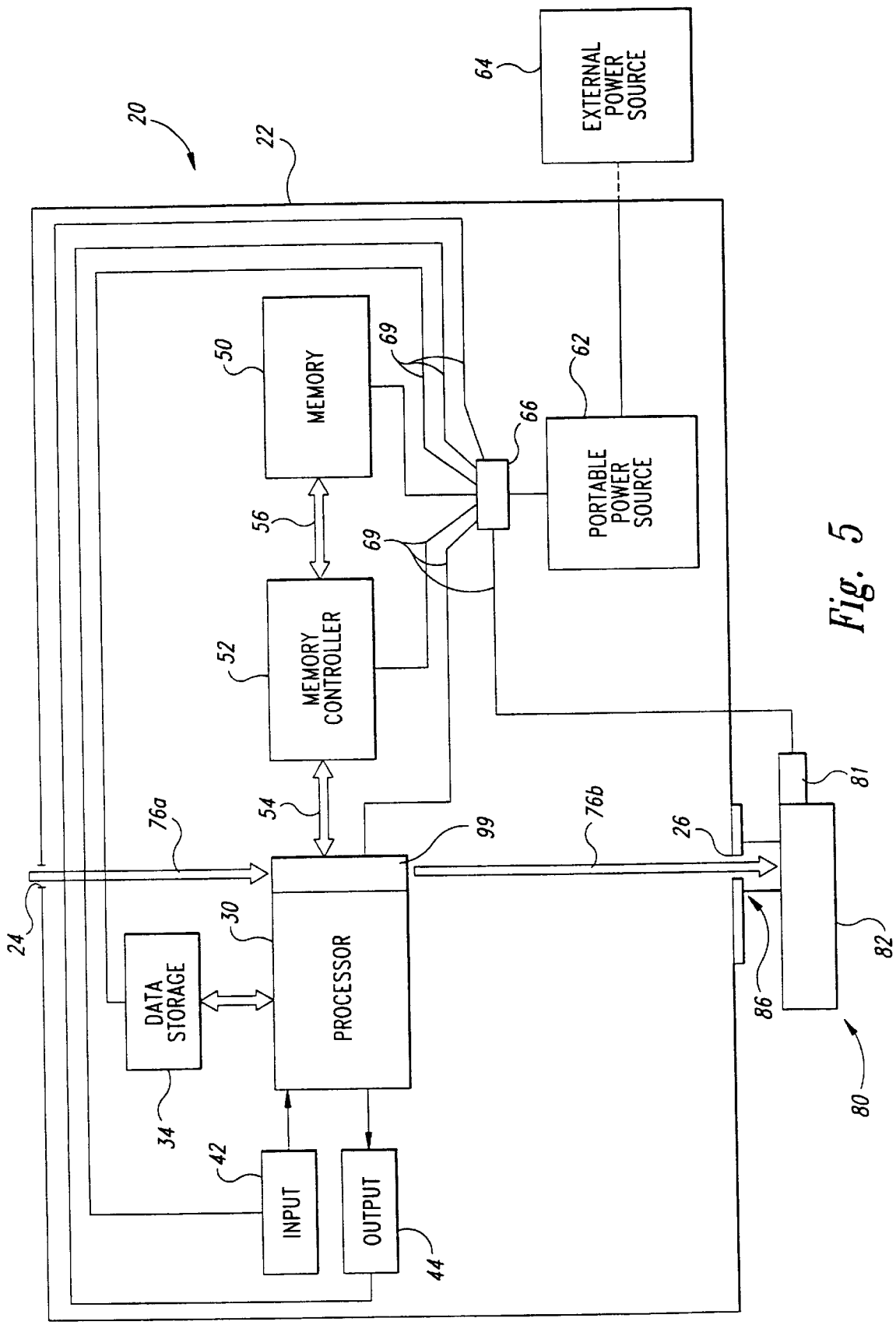
FIG. 5 is a block diagram of another portable computer in accordance with the invention.

FIG. 5 illustrates another embodiment of the portable computer 20 with an open-end, removably attachable cooling system 80 that draws ambient air through the housing 22. In this embodiment, the inlet port 24 in the housing 22 is preferably positioned on one side of the processor 30, and the outlet port 26 in the housing 22 is preferably positioned on another side of the processor 30. The cooling system 80 has a cooling unit 82 and an outlet coupling 86 that couples the cooling unit 82 to the outlet port 26. The cooling unit 82 is generally a fan that draws air into the housing 22 through the inlet port 24 to form an air stream that passes across the processor 30 to the outlet port 26. In a preferred embodiment, a passive heat exchanger 99 is attached to the processor 30 in alignment with the path defined by the fluid streams 76(a) and 76(b). The passive heat exchanger 99 increases the surface area over which the heat dissipates from the processor 30 to enhance the heat transfer rate between the processor 30 and the fluid streams 76(a) and 76(b). The cooling unit 82 preferably dissipates the heated air to the atmosphere. The cooling system 80 illustrated in FIG. 5 may be enabled and disabled from the portable computer 20 by the switch 81, or simply by physically disconnecting the coupling 86 from the outlet port 26, as discussed above with respect to FIG. 4.

Figure 6:
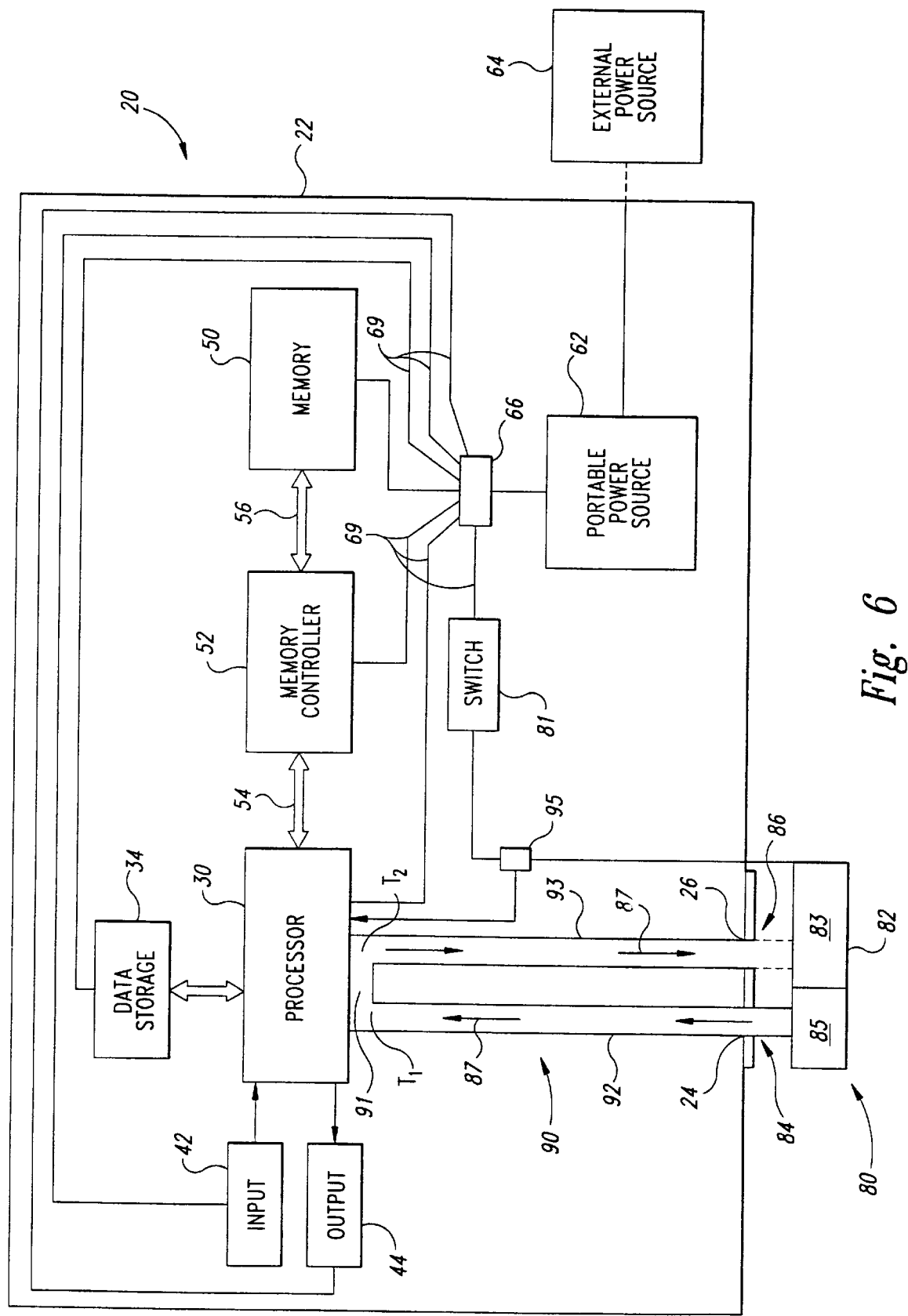
FIG. 6 is a block diagram of another portable computer in accordance with the invention.

FIG. 6 illustrates another embodiment of the portable computer 20 in which the cooling system 80 is a closed-end system that uses an enhanced cooling fluid 87, such as Freon. The cooling system 80 further includes a duct 90 through which the cooling fluid 87 flows between the cooling unit 82 and the processor 30. The duct 90 preferably has a heat transfer section 91 proximate to the processor 30. The duct 90 also includes an inlet section 92 connected to the inlet port 24 in the housing 22 and to an inlet side of the heat transfer section 91, and an outlet section 93 connected to the outlet port 26 in the housing 22 and an outlet side of the heat transfer section 91. The cooling unit 82 has an inlet coupling 84 adapted to connect to the inlet port 24, and an outlet coupling 86 adapted to connect to the outlet port 26.

The cooling unit 82 preferably has a fan 83 to drive the cooling fluid 87 through the inlet section 92, the heat transfer section 91, and out through the outlet section 93 to the cooling unit 82. The cooling unit 82 also preferably has a compressor 85 to reduce the heat of the cooling fluid 87. The closed-end cooling system 80 passes the cooling fluid 87 at a temperature $T_1$ across the processor 30, which heats the cooling fluid 87 to a temperature $T_2$ at the outlet side of the heat transfer section 91. The compressor 85 reduces the temperature of the cooling fluid from approximately $T_2$ back to approximately $T_1$ as the fan 83 circulates the cooling fluid 87 through the system.

The closed-end cooling system 80 illustrated in FIG. 6 operates in substantially the same manner as the open-end cooling systems illustrated in FIGS. 4 and 5. The closed-end cooling system 80 is disabled in a power-saving mode either by opening the switch 81, or by physically disconnecting the couplings 84 and 86 from the inlet and outlet ports 24 and 26, respectively. It will be appreciated that the closed-end cooling unit illustrated in FIG. 6 offers the same advantages as discussed above with respect to the open-end cooling system of FIG. 4.

In another embodiment of the cooling system 80 shown in FIGS. 4–6, a sensor 95 (shown in FIG. 6) senses when the cooling system 80 is enabled and signals the processor 30 that it should run at its maximum operating rate. It will be appreciated that a processor rate control system 100 (shown in FIG. 1) may be used to run the processor 30 at the maximum clock frequency $f_o$ when the sensor 95 indicates that the cooling system 80 is enabled.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A portable computer, comprising:

a processor operatively coupled to an input device, an output device, and a memory device;

a portable power source operatively coupled to the processor;

a selectively operable cooling system having a cooling unit coupled to the portable power source and an automatically operated switch coupled to the cooling unit, the switch selectively disconnecting the cooling unit from the portable power source to de-energize the cooling unit in a desired power-saving mode during which the processor continues to operate, and the switch selectively connecting the cooling unit to the portable power source to energize the cooling unit; and a sensor that detects when the portable power source supplies power to the processor, the automatic switch de-energizing the cooling unit when power is supplied by the portable power source.

2. The portable computer of claim 1 wherein the cooling unit and the switch are fixedly attached to the portable computer so as to be permanent components of the portable computer.

3. The portable computer of claim 1, further comprising a processor rate control system having a clock adapted to generate a plurality of clock output frequencies, a multiplexer coupled to the processor and the clock output frequencies, and a temperature sensor coupled to the processor to measure the processor operating temperature, wherein, when the cooling unit is disabled, the temperature sensor signals the processor with a measured temperature and the processor controls the multiplexer to send a desired clock frequency output to the processor in correspondence to the measured temperature.

4. A portable computer, comprising:

a housing defining a cavity;

a processor positioned within the cavity, the processor being operatively coupled to an input device, an output device, and a memory device;

a portable power source operatively coupled to the processor;

a selectively operable cooling system having a cooling unit operatively coupled to a power source and an automatically operated switch coupled to the cooling unit to selectively de-energize the cooling unit according to a predetermined power-saving mode, the cooling unit being fixedly attached to the housing to create a heat transfer zone in which heat dissipates from the processor, and the switch selectively disconnecting the power source from the cooling unit to de-energize the cooling unit in the desired power-saving mode during which the processor continues to operate; and a sensor that detects when the portable power source supplies power to the processor and directs the automatic switch to de-energize the cooling unit.

5. The portable computer of claim 4, further comprising a processor rate control system having a clock adapted to generate a plurality of clock output frequencies, a multiplexer coupled to the processor and the clock output frequencies, and a temperature sensor coupled to the processor to measure the processor operating temperature, wherein, when the cooling unit is in a power-saving mode, the temperature sensor signals the processor with a measured temperature and the processor controls the multiplexer to send a desired clock frequency output to the processor in correspondence to the measured temperature.

6. The portable computer of claim 4, further comprising a thermostat secured within the cavity proximate to the processor, the thermostat sensing a temperature proximate to the processor and controlling the switch to energize the cooling unit when the sensed temperature is higher than a maximum acceptable operating temperature.

7. The portable computer of claim 4, further comprising a passive heat exchanger attached to the processor, the heat exchanger being in the heat transfer zone created by the cooling unit.

8. A light-weight portable computer that may be easily carried by an operator and operated independently of a permanent power supply, comprising:

a processor operatively coupled to an input device, an output device, and a memory device;

a portable power source operatively coupled to the processor;

a selectively operable cooling system having a cooling unit coupled to the portable power source and an automatically operated switch coupled to the cooling unit, the switch selectively disconnecting the cooling unit from the portable power source to de-energize the cooling unit in a desired power-saving mode during which the processor continues to operate, and the switch selectively connecting the cooling unit to the portable power source to energize the cooling unit; and a sensor that detects when the portable power source supplies power to the processor, the automatic switch de-energizing the cooling unit when power is supplied by the portable power source.

9. The portable computer of claim 8, further comprising a processor rate control system having a clock adapted to generate a plurality of clock output frequencies, a multiplexer coupled to the processor and the clock output frequencies, and a temperature sensor coupled to the processor to measure the processor operating temperature, wherein, when the cooling unit is in a power-saving mode, the temperature sensor signals the processor with a measured temperature and the processor controls the multiplexer to send a desired clock frequency output to the processor in correspondence to the measured temperature.

10. The portable computer of claim 8, further comprising a thermostat secured within the cavity proximate to the processor, the thermostat sensing a temperature proximate to the processor and controlling the switch to energize the cooling unit when the sensed temperature is higher than a maximum acceptable operating temperature.

11. The portable computer of claim 8, further comprising a passive heat exchanger attached to the processor, the heat exchanger being in the heat transfer zone created by the cooling unit.

* * * * *